United States Patent [19]
Ross et al.

[11] Patent Number: 6,079,923
[45] Date of Patent: Jun. 27, 2000

[54] HYBRID PANEL FASTENER

[75] Inventors: Harold D. Ross, Chalfont; William P. McDonough, Royersford; Craig G. Link; Robert F. Stotz, Jr., both of Perkasie; Peter A. Vogel, Dublin, all of Pa.

[73] Assignee: Penn Engineering & Manufacturing Corp., Danboro, Pa.

[21] Appl. No.: 09/292,619

[22] Filed: Apr. 15, 1999

Related U.S. Application Data

[60] Provisional application No. 60/082,760, Apr. 23, 1998.

[51] Int. Cl.[7] .............................. F16B 21/18; F16B 23/00; F16B 39/00
[52] U.S. Cl. ................................ 411/353; 411/7; 411/107; 411/396; 411/970; 411/999
[58] Field of Search ...................... 411/107, 352, 411/353, 377, 396, 7, 970, 999

[56] References Cited

U.S. PATENT DOCUMENTS

| | | | |
|---|---|---|---|
| 3,167,105 | 1/1965 | Rosan | 411/7 X |
| 5,020,951 | 6/1991 | Smith | 411/107 |
| 5,094,579 | 3/1992 | Johnson | 411/107 |
| 5,586,852 | 12/1996 | Ganter | 411/353 |

*Primary Examiner*—Neill Wilson
*Attorney, Agent, or Firm*—Gregory J. Gore

[57] ABSTRACT

A captive panel fastener includes a retractable screw having a thermal plastic cap molded around its head. The cap includes slotted skirt with resilient fingers. When the retractable screw is forced downward through the bore of the ferrule having divergent sides, the fingers of the cap spread apart by the wedging action against the outside surface of the ferrule, thus providing a biasing force urging the screw in an upward retracted direction. The ends of the cap fingers include inward facing ribs which fall into a circumferential groove around the outside surface of the ferrule adjacent its bottom end. The groove may further include plurality of radial extending teeth which engage inward facing protrusions located on the fingertip ribs to resist unwanted loosening of the screw.

7 Claims, 3 Drawing Sheets

HYBRID PANEL FASTENER

The applicants hereby claim priority based upon provisional patent application Ser. No. 60/082,760 entitled, "Panel Fastener", filed Apr. 23, 1998.

FIELD OF THE INVENTION

The present invention relates to captive panel fasteners of the type having a retractable screw that is spring-biased in a retracted position. The screw is captive and extendable within a ferrule which is attachable to one of two panels joined by the fastener.

BACKGROUND OF THE INVENTION

Retractable panel fasteners are well-known in the art and include a screw which is biased in a retracted position by resilient means acting between the underside of the head of the screw and the top of the ferrule element which is affixed to a first panel. The resilient means is usually a metal coil spring. When it is desired to extend the threaded end of the screw so that, for example, the first panel may be threadably affixed to a second panel, the screw is extended against the force of the spring and turned to affect the threaded engagement with female threads on the second panel.

SUMMARY OF THE INVENTION

The present invention provides a marked improvement over the prior art by replacing the coil spring element with a mold-around cap having resilient fingers which are spread apart as the screw is extended. The fingers of the cap ride along axially divergent sides of the ferrule to provide the biasing force to hold the screw in its retracted position. The cap may be affixed by simply molding a flexible, preferably plastic material around the head of the screw. The cap may further include other structures, such as knurling or fluting to increase finger grip on the cap. The thermoplastic element further provides the possibility of color-coding different fasteners by changing the color of the plastic material. The result is a simplified assembly with fewer parts.

More specifically, the applicants have invented a panel fastener comprising a ferrule having a frustoconical outside surface divergent toward the bottom thereof, said ferrule including a bore for receiving a rotatable and axially slidable screw within said bore. The screw has a head at the top, a shank and a threaded portion at the bottom. A thermoplastic cap is molded around said head of said screw, said cap including a slotted skirt with resilient fingers such that when said screw is moved downward through said bore of said ferrule, said fingers of said cap engage the outside surface of said ferrule, spreading said figures radially outward, thus providing a biasing force urging said screw in an upward direction. The ferrule includes screw captivation means at its top end and panel attachment means at its bottom end. The fingertips of the cap include inward facing ribs which fall into a circumferential groove around the outside surface adjacent to the bottom end of the ferrule when the screw is in an extended position. The groove may further include a plurality of radially extended rachet teeth located along its inside surface. Inward facing protrusions located along the bottom portion of the fingers engage with the rachet teeth when the screw is in the extended position to provide a locking force to prevent screw from loosening.

Other objects and advantages and novel features of the invention will become apparent from the following detailed description of the invention when considered in conjunction with the accompanying drawings.

DESCRIPTION OF THE PREFERRED EMBODIMENT

Figure 1:
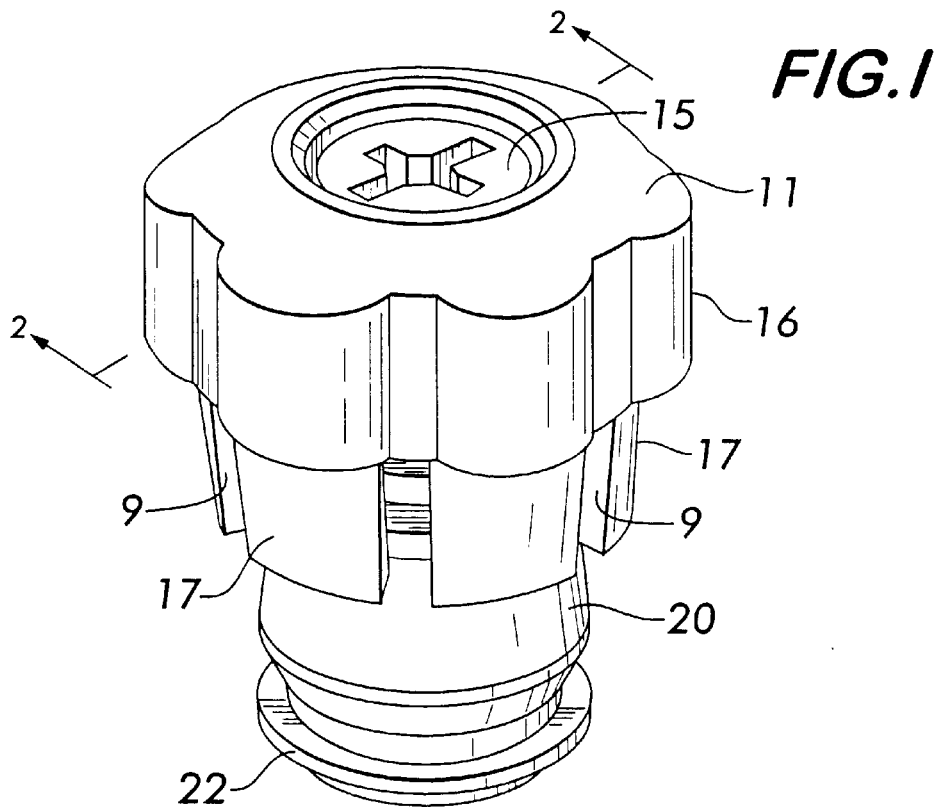
FIG. 1 is a top front isometric view of the present invention.

Referring now to FIG. 1, the mold-around cap 11 of the present invention is shown affixed to screw member 15. As will be more fully shown with regard to FIGS. 2 and 3, the cap is preferably a moldable material attached around the top, side, and bottom surfaces of the circumference area of screw head 15 preferably by molding but not limited to that means of attachment. The thermoplastic cap may include lobes 16 to increase finger grip. Other structures such as knurling or fluting may be used along the outside of the cap for the same purpose. The cap includes a skirt having individual fingers 17 separated by slots 9. The end of each finger provides the operative point of contact between the fingers of the cap and a frustoconical ferrule 20. Attachment means 22 at the bottom of the ferrule such as a clinch flange and undercut provide attachment into an aperture of a panel by press fit as shown in FIG. 2.

Figure 2:
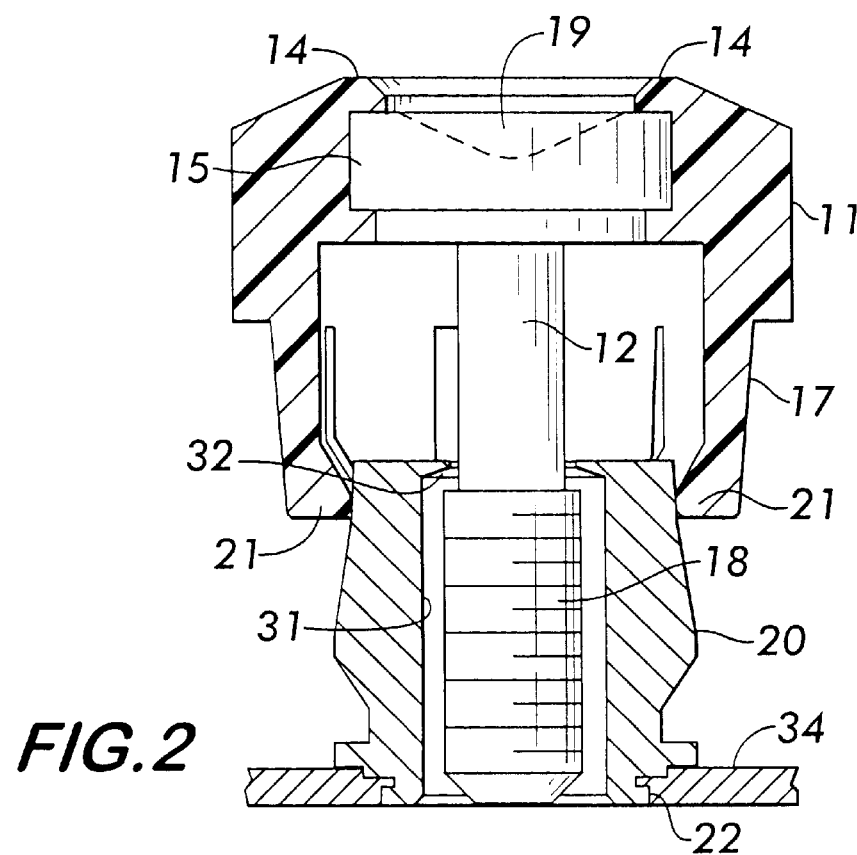
FIG. 2 is a side sectional view of the embodiment shown in FIG. 1 with the panel fastener screw in; retracted position.

Referring now to FIG. 2, greater detail of the fastener of FIG. 1 is shown. The top portion of the cap 11 includes an annular ring 14 which is molded around screw head 15 so that it encompasses the top, side, and bottom edges. A circular opening in the top of the cap permits the top face of the screw head and its tool engagement recess 19, such as a Phillips head recess more clearly shown in FIG. 1, to be accessible by a tool from above. The opening also permits direct contact between the screwhead and a ram when the cap and ferrule are initially assembled. The screw further includes a shank 12 connected to an enlarged threaded portion 18 at the bottom which, after assembly, is captive within ferrule 20 of the fastener. The ferrule has a cylindrical bore 31 through which the screw slides. At the top of the ferrule a collar 32 captivates the screw. When the two parts of the fastener are manufactured, the enlarged threaded portion 18 of the screw fits through the deformable collar, however, upon compression of the collar with the bottom side of the screw head, the upper rim of the collar becomes pressed downward and inward, reducing its diameter about the shank of the screw to captivate the screw rotatably and slidably within the ferrule.

Figure 3:
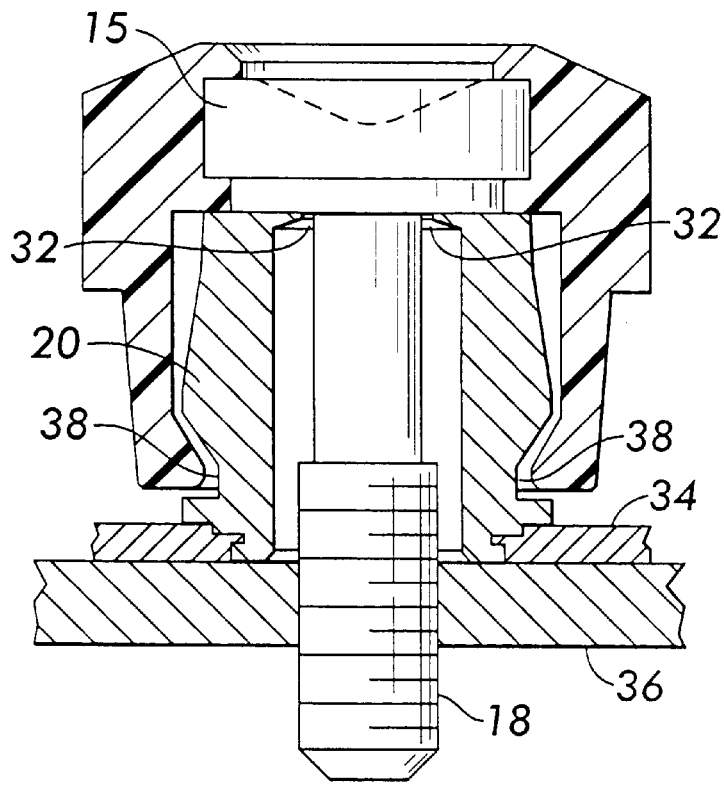
FIG. 3 is a side sectional view of the embodiment shown in FIG. I showing the panel fastener screw in its extended position.

The ferrule 20 is substantially frustoconical and is attached to a first panel 34 by press fit attachment means 22. The ferrule has a divergent outside surface which, as will be described with regard to FIG. 3, provides wedging action against the fingers 17 of the cap 11 as it is forced downward. The operative contact points between the cap and the ferrule are inward facing arcuate ribs 21 located along the bottom edge of each of the cap fingers 17. Because a resilient thermoplastic material is used to form the cap, the fingers function as individual leaf springs, and as the screw and cap are moved downward, fingers 17 are resiliently spread apart by the wedging interaction against the ferrule 20. Because the fingers 17 are resiliently inwardly biased toward their at-rest position shown in this figure, the wedging action against the base member 20 provides a resulting biasing force against screw head 15 in the retracted direction.

Referring now to FIG. 3, the panel fastener of the present invention is shown in its extended position with collar 32 inwardly deformed, providing positive captivation of the screw within the ferrule. The threaded end of the screw 18 projects from the bottom of ferrule 20 so that it is exposed to threadably engage a second threaded panel 36 thereby securing it to the first panel 34. It will be readily understood by those of skill in the art that at an intermediate position between the positions shown in FIG. 2 and FIG. 3, the fingers along the bottom skirt of the cap 11 will be spread apart, having been wedged axially outward by the divergently tapered surface of the ferrule 20. In the intermediate position a net axial force is applied to the screw in the upward direction.

With continuing reference to FIG. 3, at the base of the ferrule 20 the sides concentrically converge to form a groove 3 8 which receives the inward facing ribs 21 of the fingertips when the screw 15 is in its fully extended position as shown in this Figure. This position provides a temporary lock to hold the screw axially in its extended position. It also permits the resilient fingers to return to the relaxed state of their at-rest position so that the fingers will not lose their resilience if the fastener remains tightened down with the screw in its extended position for a long time.

Figure 4:
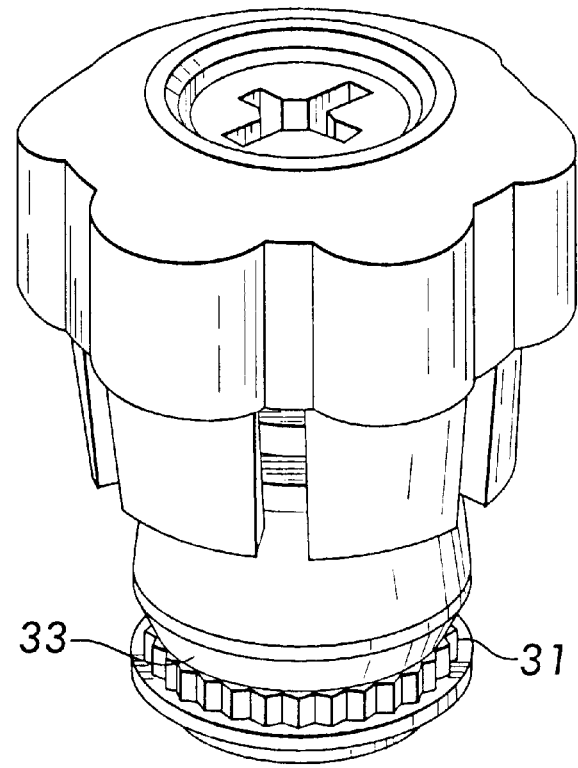
FIG. 4 is a top front isometric view of an alternate embodiment of the present invention.

Referring now to FIG. 4, an additional embodiment of the present invention is shown which is similar to the embodiment shown in FIGS. 1 through 3 except that the groove at the base of the ferrule includes rachet teeth 31. Rachet teeth 31 extend radially along the inside surface of groove 3 8. These teeth engage protrusions on the inside of the fingertips shown in more detail as explained below with regard to FIG. 6.

Figure 5:
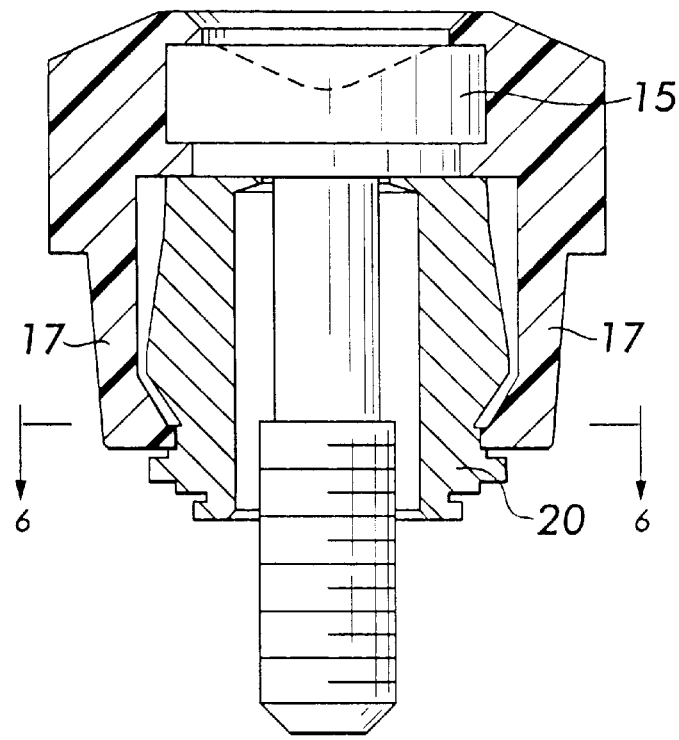
FIG. 5 is a side sectional view of the embodiment shown in FIG. 4 with the panel fastener screw in its extended position.

Referring now to FIG. 5, the embodiment of the captive fastener shown in FIG. 4 is depicted with screw 15 in its extended position similar to the embodiment shown in FIG. 3. In this position, the ribs of fingers 17 fall into groove 38 on the bottom circumference of the ferrule 20 when the screw 15 is extended.

Figure 6:
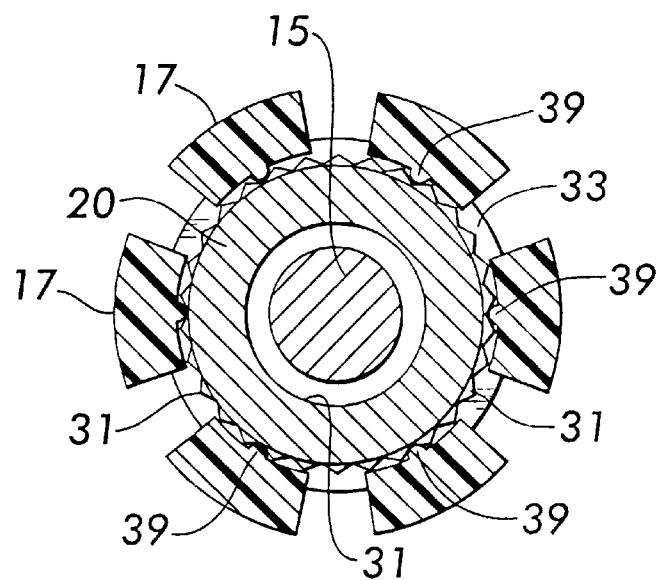
FIG. 6 is a top sectional view of the present invention taken from the embodiment shown in FIG. 5 as shown in that figure.

Referring now to FIG. 6, a sectional plan view taken from FIG. 5 is shown. Screw 15 is positioned in the center of the cylindrical bore 3 1 of the ferrule 20. Individual fingers 17 extend into groove 38 at the inward facing ribs of the fingertips. As depicted in FIG. 6, this embodiment also includes inward facing protrusions 39 which engage the rachet teeth 31 located radially along the inner surface of the groove. This combination of teeth and protrusions resists a tightened-down screw from unwanted loosening.

From the foregoing drawings and description, it will be readily understood by those of ordinary skill in fastener arts that the present invention provides a resiliently-biased panel fastener which maintains the screw in a retracted position at rest without using the traditional metal coil spring between the top of the ferrule and the head of the screw. This provides a greatly simplified construction. In yet another embodiment, these operational features may also include structures along a divergent outer surface of the ferrule which interact with the fingers of the cap to provide a locking function for the screw.

It should be understood that the above description discloses specific embodiments of the present invention and are for purposes of illustration only. There may be other modifications and changes obvious to those of ordinary skill in the art that fall within the scope of the present invention which should be limited only by the following claims and their equivalents.

What is claimed is:

1. A panel fastener, comprising:

a ferrule having a frusto-conical outside surface divergent toward the bottom thereof, said ferrule including a bore for receiving a rotatable and axially slidable screw within said bore;

said screw having a head at the top, a shank, and a threaded portion at the bottom; and a thermoplastic cap molded around said head of said screw, said cap including a slotted skirt with resilient fingers, such that when said screw is moved downward through said bore of said ferrule, said fingers of said cap wedge against an outside surface of said ferrule spreading said fingers radially outward, thus providing a force urging said screw in an upward direction.

2. The panel fastener of claim 1 further including panel attachment means at the bottom of said ferrule.

3. The panel fastener of claim 2 wherein said ferrule further includes a circumferential groove along the outside surface adjacent to the bottom end of said ferrule for receiving inward facing ribs at the ends of said fingers when the screw is in an extended position.

4. The panel fastener of claim 3 wherein the head of said screw includes cap having a circular aperture with means to facilitate rotation thereof by a tool.

5. The panel fastener of claim 4 further including a plurality of radially-extending teeth located along an inside surface of said groove.

6. The panel fastener of claim 5 wherein said ribs of said fingers further include a plurality of inward-facing protrusions located along the end portion of said fingers, said protrusions engaging said rachet teeth when said screw is turned while in the extended position.

7. The panel fastener of claim 1 further including screw captivation means adjacent the top of the ferrule.

* * * * *